(12) United States Patent
French et al.

(10) Patent No.: US 6,480,380 B1
(45) Date of Patent: Nov. 12, 2002

(54) METHODS AND APPARATUS FOR COOLING A DISK DRIVE

(75) Inventors: F. William French, Littleton, MA (US); Larry Pignolet, Mapleville, RI (US); Scot Tata, Blackstone, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/618,488

(22) Filed: Jul. 18, 2000

(51) Int. Cl.$^7$ ................................. G06F 1/16
(52) U.S. Cl. ...................... 361/690; 361/684; 361/695; 364/708.1; 312/223.1
(58) Field of Search ............................ 361/683, 681, 361/685–687, 690–699, 700–707, 715, 725–727, 754, 798, 334.1, 334.23; 312/223.1, 223.2, 334.28; 174/15.1, 15.2, 68.1, 72 A; 454/184; 360/97.03, 98.01; 364/708.1

(56) References Cited

U.S. PATENT DOCUMENTS

| | | | |
|---|---|---|---|
| 4,967,155 A | * 10/1990 | Magnuson | 324/212 |
| 5,171,183 A | * 12/1992 | Pollard et al. | 454/184 |
| 5,289,363 A | * 2/1994 | Ferchau et al. | 363/141 |
| 6,018,456 A | * 1/2000 | Young et al. | 361/684 |

* cited by examiner

Primary Examiner—Darren Schuberg
Assistant Examiner—Michael Datskovsky
(74) Attorney, Agent, or Firm—Chapin & Huang, L.L.C.; David E. Huang

(57) ABSTRACT

The invention is directed to techniques for cooling a disk drive using a louver to direct air from an air stream toward the disk drive. One arrangement is directed to a storage system which includes a cabinet assembly, and a fan assembly that provides an air stream through the cabinet assembly. The storage system further includes a disk drive assembly that fastens to the cabinet assembly. The disk drive assembly includes (i) a disk drive that stores and retrieves computerized data, and (ii) a support member that supports the disk drive. The support member defines an input louver that redirects air from the air stream toward the disk drive of the disk drive assembly. This arrangement enables forced convection air to adequately cool the disk drive thus reducing disk drive operating temperature and lowering the disk drive failure rate. This lowering of the failure rate translates into improved field reliability and lower repair costs. In one arrangement, the support member includes highly stiff material (e.g., sheet metal) which provides adequate stiffness to support the disk drive and allows (i) high convective cooling on both sides of the disk drive and (ii) low air impedance (i.e., pressure drop). In one arrangement, a louvered side of the support member directs air over a disk spindle bearing of the disk drive which is a substantial source of heat. In one arrangement, the support member acts as a cover to protect circuit board components against inadvertent handling that could damage the components.

28 Claims, 7 Drawing Sheets

METHODS AND APPARATUS FOR COOLING A DISK DRIVE

BACKGROUND OF THE INVENTION

Some computer storage systems include multiple disk drives for storing data. Such disk drives typically include circuit board portions and head disk assembly portions, and reside in housings which install within a cabinet. The housings hold the disk drives in fixed locations within the cabinet such that an air stream within the cabinet (e.g., from one or more cooling fans) provides a cooling effect to the disk drives.

One conventional housing is made completely of light-weight plastic, and surrounds the disk drive in order to provide adequate support against disk drive vibration. Elongated holes in the housing, which extend along the direction of the air stream, expose sections of the circuit board portion and the head disk assembly portion of the disk drive to the air stream in order to allow heat from the disk drive to escape thus reducing the disk drive operating temperature. This temperature reduction lowers the disk drive failure rate.

In some configurations, each housing holds other components in addition to a disk drive. For example, each housing can further hold a daughter card which operates as an interface between a storage system controller and the disk drive contained in that housing. As another example, each housing can further hold a lever which a user actuates in order to (i) install the housing into the cabinet and (ii) remove the housing from the cabinet.

SUMMARY OF THE INVENTION

Unfortunately, there are deficiencies associated with the use of conventional disk drive housings. In particular, a conventional light-weight plastic housing, which completely surrounds a disk drive and provides elongated holes in a direction of an air stream, may not provide adequate cooling. If these holes were to be made larger, the structural characteristics of the housing would be weakened, and the housing would not be able to provide adequate support against disk drive vibration. The excess vibration would cause the disk drive to experience data access problems, e.g., incorrect address and data reads when seeking particular locations on the disk drive.

In contrast, the invention is directed to techniques for cooling a disk drive using a louver to direct air from an air stream toward the disk drive. One arrangement is directed to a storage system which includes a cabinet assembly, and a fan assembly that provides an air stream through the cabinet assembly. The storage system further includes a disk drive assembly that fastens to the cabinet assembly. The disk drive assembly includes (i) a disk drive that stores and retrieves computerized data, and (ii) a support member that supports the disk drive. The support member defines an input louver that redirects air from the air stream toward the disk drive of the disk drive assembly. This arrangement enables forced convection air to adequately cool the disk drive thus reducing disk drive operating temperature and lowering the disk drive failure rate. This lowering of the failure rate translates into improved field reliability and lower repair costs.

In one arrangement, the support member of the disk drive assembly defines multiple input louvers (e.g., two) that redirect air from the air stream toward the disk drive of the disk drive assembly. The multiple input louvers increase the amount of air from the air stream which cools the disk drive for an improved cooling effect.

In one arrangement, the support member of the disk drive assembly further defines output louvers that enable air adjacent the disk drive to escape toward the air stream. The output louvers facilitate the flow of air passing the disk drive.

In one arrangement, the support member of the disk drive assembly includes a metallic housing (e.g., steel) that defines each louver. The metallic housing provides high stiffness in order to adequately control vibration of the disk drive. Moreover, the louvers can be punched into the metallic housing in order to obtain a stiffening effect from work hardening and bending action occurring in the metal.

In one arrangement, the disk drive of the disk drive assembly includes a head disk assembly portion and a circuit board portion, and the support member of the disk drive assembly is configured to fully expose a side of the head disk assembly portion of the disk drive to the air stream. Such exposure maximizes air flow over the head disk assembly portion for effective cooling of the head disk assembly portion.

The features of the invention, as described above, may be employed in data storage systems and other computer-related components such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for cooling a disk drive using a louver to direct air from an air stream toward the disk drive. This enables forced convection air to adequately cool the disk drive thus reducing disk drive operating temperature and lowering the disk drive failure rate. The lower failure rate translates into improved field reliability and lower repair costs. The techniques of the invention may be employed in data storage systems, as well as other computer-related systems and devices, such as those manufactured by EMC Corporation of Hopkinton, Mass.

Figure 1:
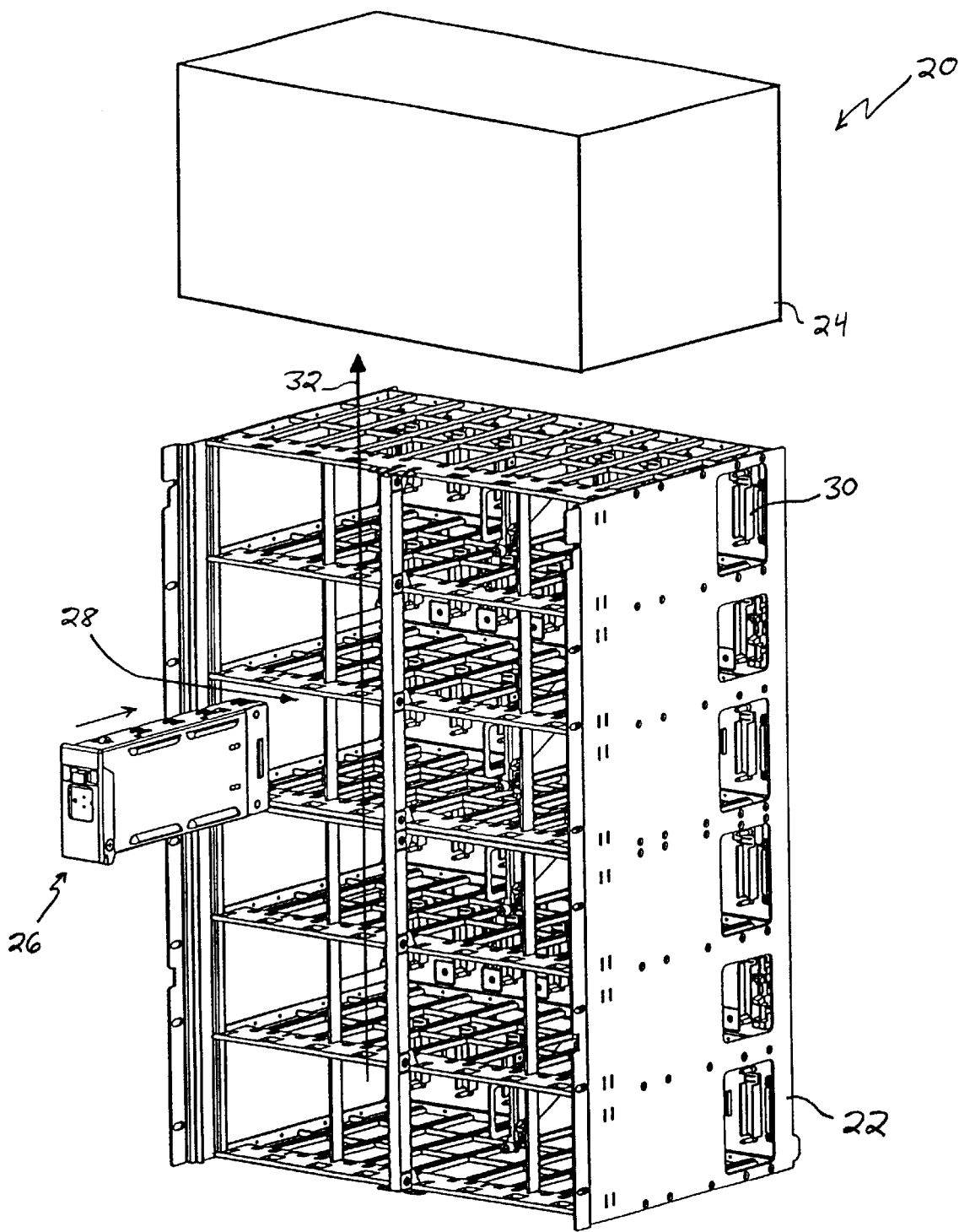
FIG. 1 is a perspective view of a storage system which is suitable for use by the invention.

FIG. 1 shows a storage system 20 which is suitable for use by the invention. The storage system 20 includes a cabinet assembly 22, a fan assembly 24 and a disk drive assembly 26. The disk drive assembly 26 installs within a slot 28 of the cabinet assembly 22. In particular, the disk drive assembly 26 connects with a connector 30 of the cabinet assembly 22 in order to communicate with other computer components (e.g., a controller, a processor, etc.). The fan assembly 24 provides an air stream 32 through the cabinet assembly 22. The disk drive assembly 26 includes a louvered support member which extends into the air stream 32 when the disk drive assembly 26 is installed within the cabinet assembly 22. As a result, the louvered support member redirects air from the air stream 32 toward various components within the disk drive assembly 26.

Figure 2:
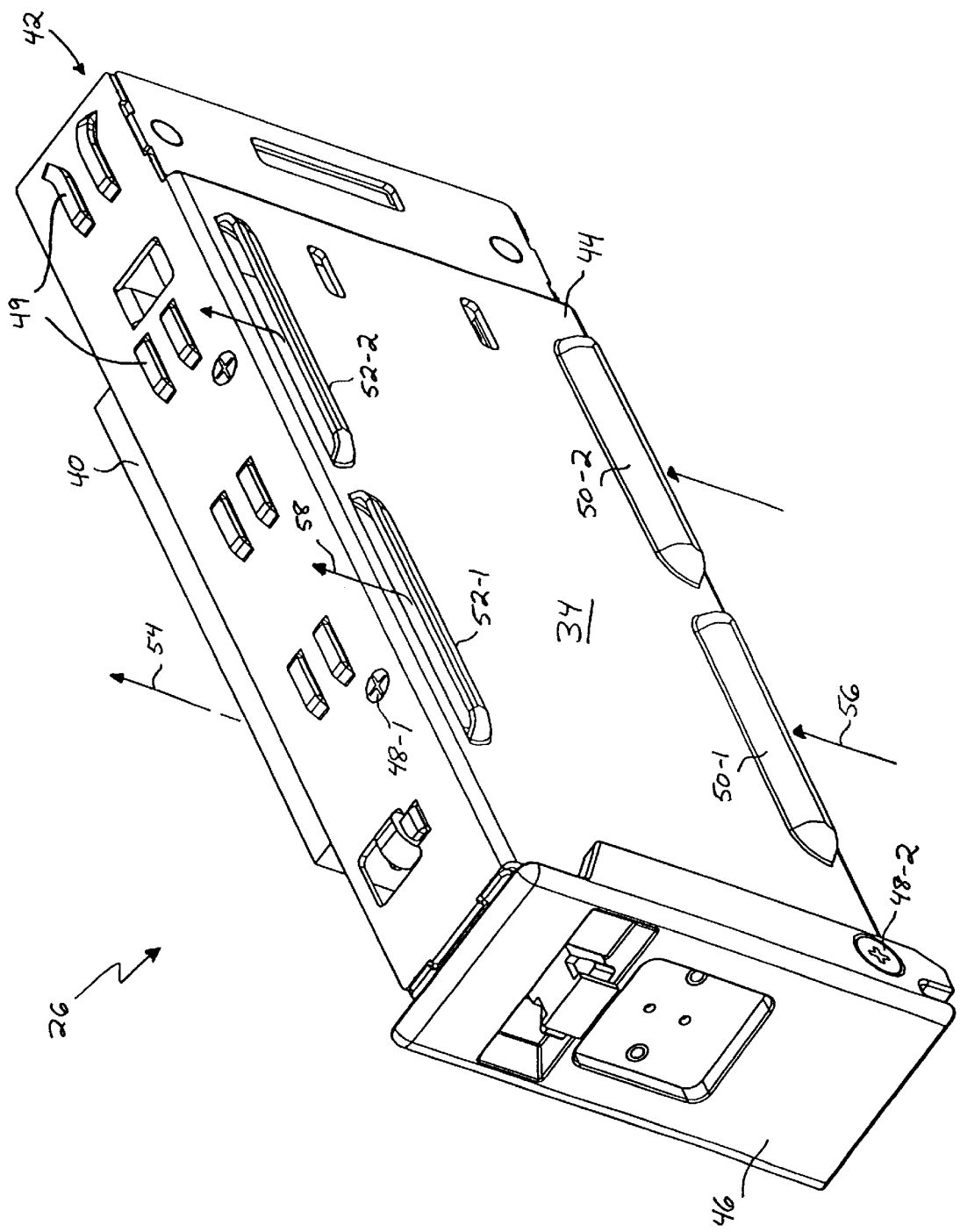
FIG. 2 is a perspective view of a disk drive assembly of FIG. 1 having input and output louvers for directing air of an air stream such that the air cools a disk drive of the disk drive assembly.

FIG. 2 shows further details of the disk drive assembly 26 which includes a disk drive 40, a daughter card 42 (shown only generally by the arrow 42 in FIG. 2), a louvered support member 44 and a lever 46. The support member 44 includes, among other things, a housing 34 and hardware 48. The disk drive 40 fastens to the support member 44 through hardware 48-1. Similarly, an end of the lever 46 pivotably fastens to the support member 44 through hardware 48-2.

When the disk drive 40 is installed within the cabinet assembly 22 and in operation, the disk drive 40 is capable of storing and retrieving data. The daughter card 42 connects with a connector 30 of the cabinet assembly 22 and operates as an interface between the disk drive 40 and other computer components (e.g., a controller, a processor, etc.). The lever 46 provides leverage for a user to install the disk drive assembly 26 within the cabinet assembly 22, and to remove the disk drive assembly 26 from the cabinet assembly 22. The support member includes guides 49 which assist the user in aligning the disk drive assembly 26 with the slot 28 during installation, and in holding the disk drive assembly 26 within the slot 28 once installed.

As shown in FIG. 2, the support member 44 defines input louvers 50-1, 50-2 (collectively, input louvers 50) and output louvers 52-1, 52-2 (collectively, output louvers 52). The louvers 50, 52 are slanted ventilating openings within the support member 44 which channel air from the air stream 32 (also see FIG. 1) through the disk drive assembly 26 in order to cool the disk drive 40. In particular, the input louvers 50 redirect air 56 from the air stream toward the disk drive 26, and the output louvers 52 allow air 58 adjacent the disk drive 26 to escape toward the air stream 32.

The louvers 50, 52 preferably extend in a direction that is transverse or perpendicular to the air stream 32 and reside near the top and bottom of the support member 44 in order to maximize distribution of air across components of the disk drive 40 which are housed within the disk drive assembly 26. In one arrangement, the input louvers 50 act as scuppers which change the direction of air in the air stream 32 such that the redirected air impinges on the disk drive 40 in a nearly perpendicular direction to more directly break into a boundary layer along areas of the disk drive 40 (e.g., circuit board components). Furthermore, the created air turbulence increases the convective heat transfer coefficient of the disk drive arrangement.

In one arrangement, the support member housing 34 which defines the louvers 50, 52 is formed of rigid metallic material (e.g., steel). Such material provides high stiffness in order to adequately control vibration of the disk drive 40. In one arrangement, the louvers 50, 52 are punched or pressed into the housing 34 in order to obtain a stiffening effect from work hardening and bending action occurring in the housing. The stiffness of the housing 34 allows one side of the housing 34 to be open. As such, one side of the disk drive 40 is completely exposed to air 54 of the air stream 32. This enables a head disk assembly (HDA) cover of the disk drive 40 to be fully exposed and directly in the air stream 32. Accordingly, there is high convective cooling on both sides of the disk drive 40 and low air stream impedance (i.e., pressure drop). In particular, there is maximum cooling of a boundary layer (i.e., the surface of the HDA cover) of the HDA side of the disk drive 40.

As described above, the support member 44 provides multiple functions. First, it operates as a carrier for supporting the disk drive 40, and positioning the disk drive 40 properly within the cabinet assembly 22. Second, the support member 44 provides stiffness to reduce disk drive vibration resulting from the rotation of one or more magnetic disks within the disk drive 40 (i.e., rotational vibration). Additionally, the support member 44 controls air flow by redirecting air from the air stream 32 toward the disk drive 40 to provide effective cooling. Further details of the storage system 20 will now be discussed with reference to FIGS. 3A and 3B.

Figure 3A:
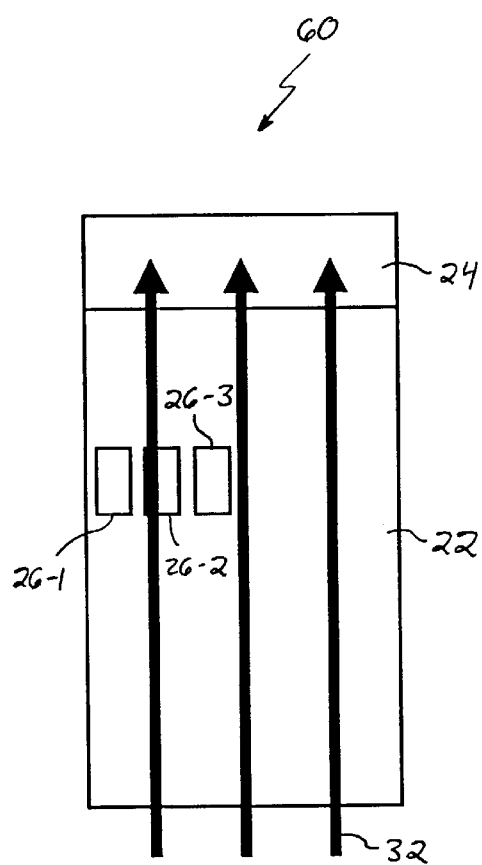
FIG. 3A is a block diagram of a first arrangement for the storage system of FIG. 1 with multiple louvered disk drive assemblies installed within a cabinet assembly of the storage system, and with a fan assembly that draws air through the cabinet assembly.

FIG. 3A shows a storage system configuration 60 which is suitable for use for the storage system 20 of FIG. 1. As shown in FIG. 3A, the fan assembly 24 resides at the top of the cabinet assembly 22 and draws air vertically from the bottom of the cabinet assembly 22 toward the top of the cabinet assembly 22. The configuration 60 includes multiple disk drive assemblies 26-1, 26-2 and 26-3 which install side-by-side traversing the air stream 32. As the air stream 32 flows past the disk drive assemblies 26, the louvers 50, 52 of the disk drive assemblies 26 direct air from the air stream 32 over the disk drives 40 (also see FIG. 2) to cool the disk drives 40. In the arrangement in which one side of the disk drives 40 is completely exposed, the air stream 32 further cools the HDA sides of the disk drives 40 directly in order to obtain effective boundary layer cooling.

Figure 3B:
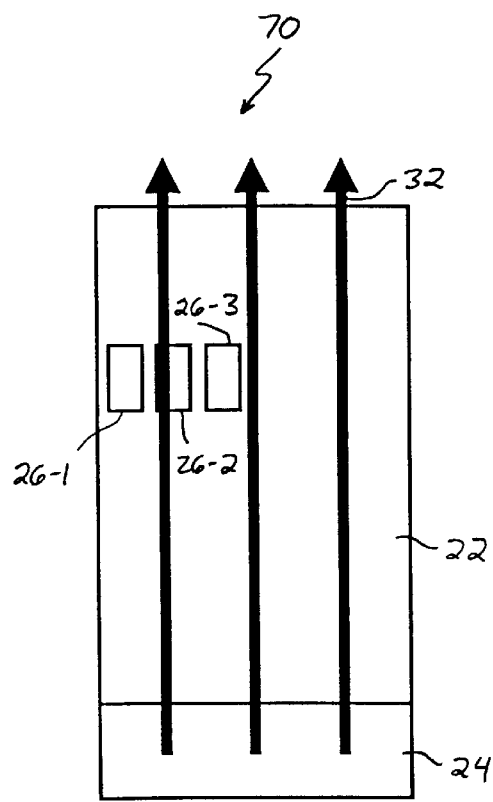
FIG. 3B is a block diagram of an alternative arrangement for the storage system of FIG. 1 with a fan assembly that pushes air through the cabinet assembly.

FIG. 3B shows a storage system configuration 70 which is also suitable for use for the storage system 20 of FIG. 1. As shown in FIG. 3B, the fan assembly 24 resides at the bottom of the cabinet assembly 22 and pushes air vertically from the bottom of the cabinet assembly 22 toward the top of the cabinet assembly 24. As in FIG. 3A, the configuration 70 of FIG. 3B includes multiple disk drive assemblies 26-1, 26-2 and 26-3 which install side-by-side traversing the air stream 32. Accordingly, louvers 50, 52 of the disk drive assemblies 26 channel air from the air stream 32 over the disk drives 40 in order to cool the disk drives 40.

It should be understood that the storage system configurations 60, 70 show only three disk drive assemblies 26 for simplicity. The configurations 60, 70 can include additional disk drive assemblies 26 as well (e.g., additional rows and columns). Further details of the disk drive 40 will now be provided with reference to FIG. 4.

Figure 4:
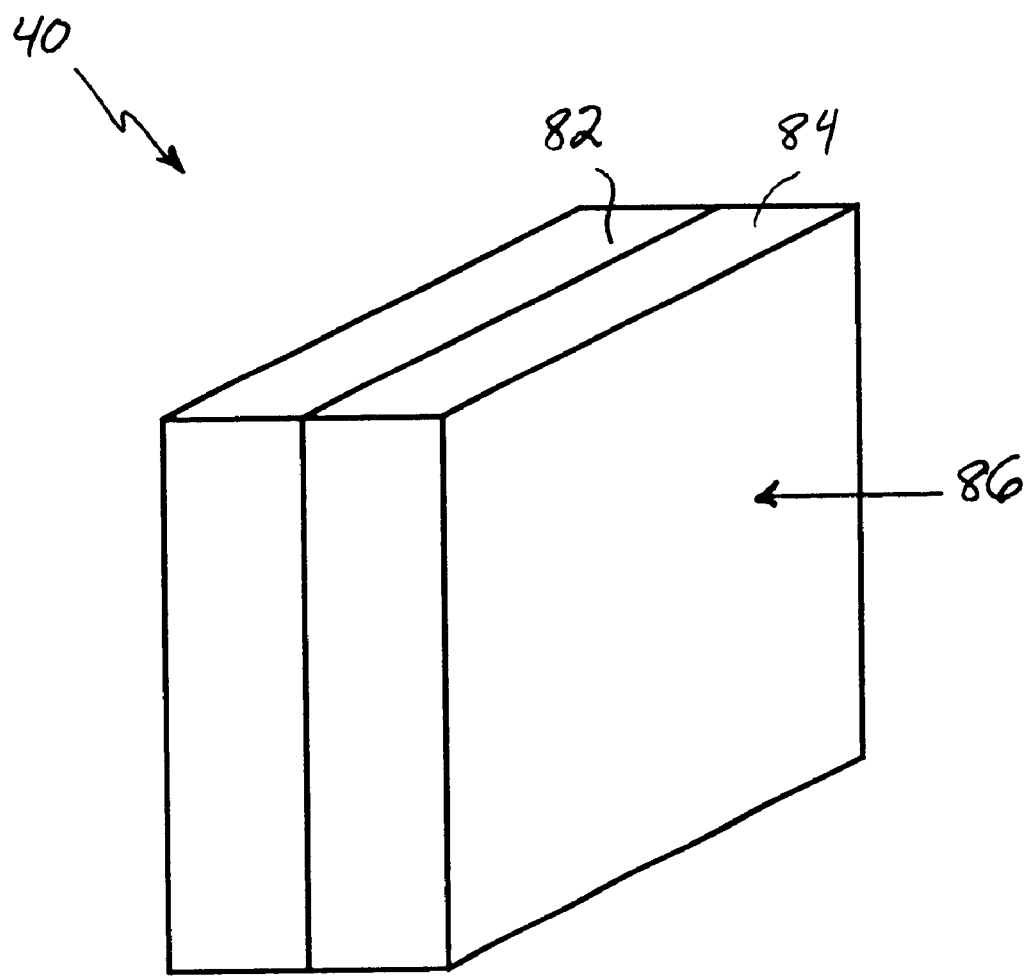
FIG. 4 is a perspective view of the disk drive of FIG. 2 which includes a circuit board portion and a head disk assembly portion.

FIG. 4 shows the disk drive 40 as including a circuit board portion 82 on one side, and a head disk assembly portion 84 on the other side. The circuit board portion 82 includes a circuit board with components mounted thereto (e.g., integrated circuits, resistors, capacitors, etc.). The head disk assembly portion 84 includes mechanical and electromechanical components (e.g., one or more magnetic disks, motor, head disk, etc.). In one arrangement, a side 86 of the head disk assembly portion 84 (i.e., the boundary layer) operates as heat sink by conveying heat from these components to the external environment. Preferably, the disk drive 40 fastens to the support member 44 such that the circuit board portion 82 faces the louvers 50, 52, and the head disk assembly portion 84 is fully exposed to the air stream 32. As such, the louvered side of the housing 34 acts as a cover for the circuit board components to prevent inadvertent handling that could damage the components.

It should be understood that the disk drive 40 includes a disk spindle bearing which is a substantial source of heat. In one arrangement, the disk spindle bearing for the disk drive 40 is located on the side of the disk drive 40 having the circuit board portion 82. As such, the louvers 50, 52 direct air over the disk spindle bearing in order to remove heat from the disk spindle bearing.

Figure 5:
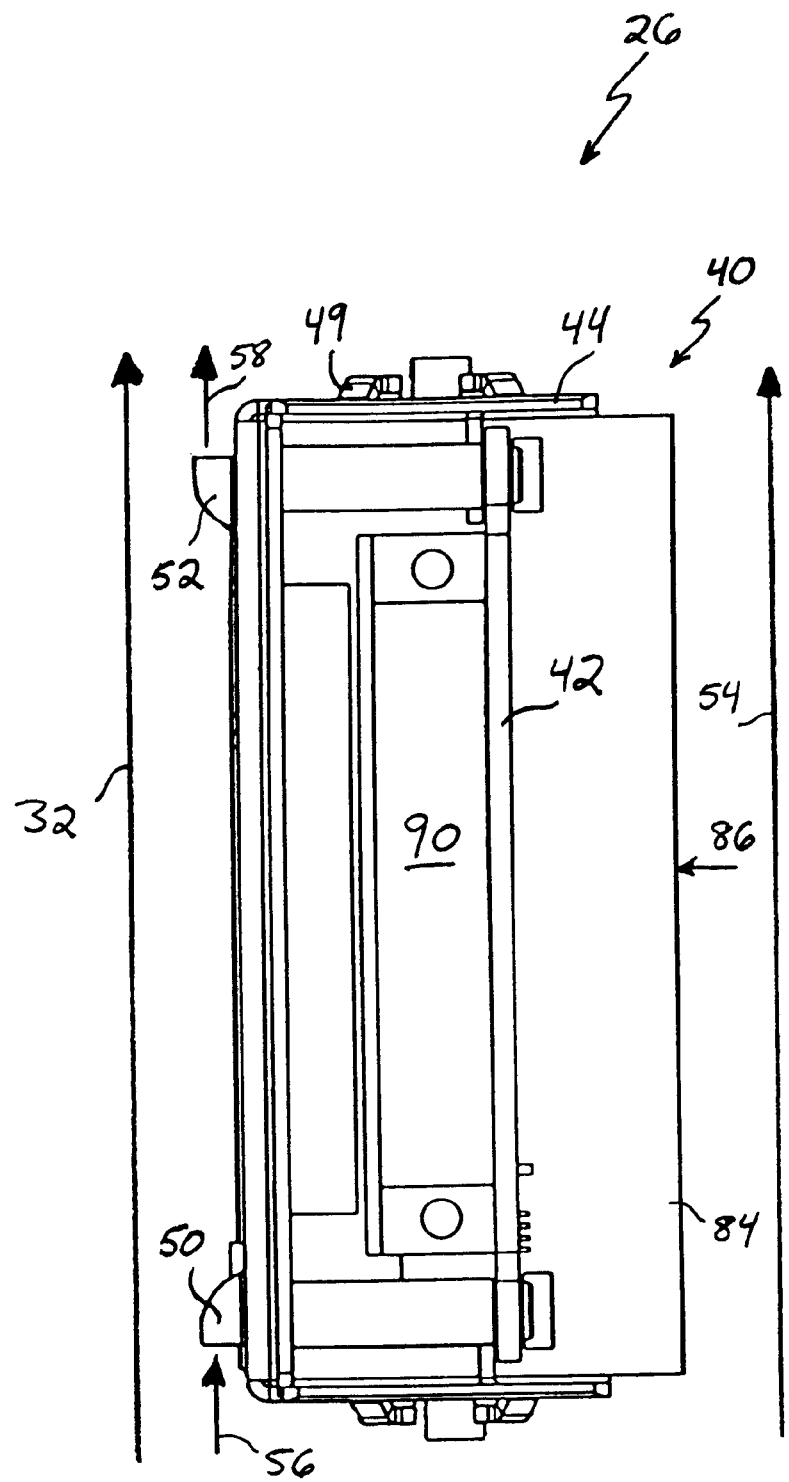
FIG. 5 is an end view of the louvered disk drive assembly of FIG. 1.

FIG. 5 shows a back view of the disk drive assembly 26, i.e., the end of the disk drive assembly 26 opposite the end having the lever 26 (also see FIG. 2). As shown in FIG. 5, the input louvers 50 redirect air 56 from the air stream 32 toward the disk drive assembly 40. Simultaneously, the air 56 displaces air 58 within the disk drive assembly 26 and adjacent the disk drive 40 such that the air 58 escapes through the output louvers 58 back into the air stream 32 to carry heat away from the circuit board portion 82. Additionally, air 54 of the air stream 32 flows past the boundary layer 86 of the head disk assembly portion 84 of the disk drive 40 to carry heat away from the head disk assembly portion 84.

FIG. 5 also shows the daughter card 42, and a connector 90 of the daughter card 42 (also see FIG. 2). The connector 90 aligns and connects with one of the connectors 30 within the cabinet assembly 22 in order to establish a communications pathway for data to travel to and from the disk drive 40.

Figure 6:
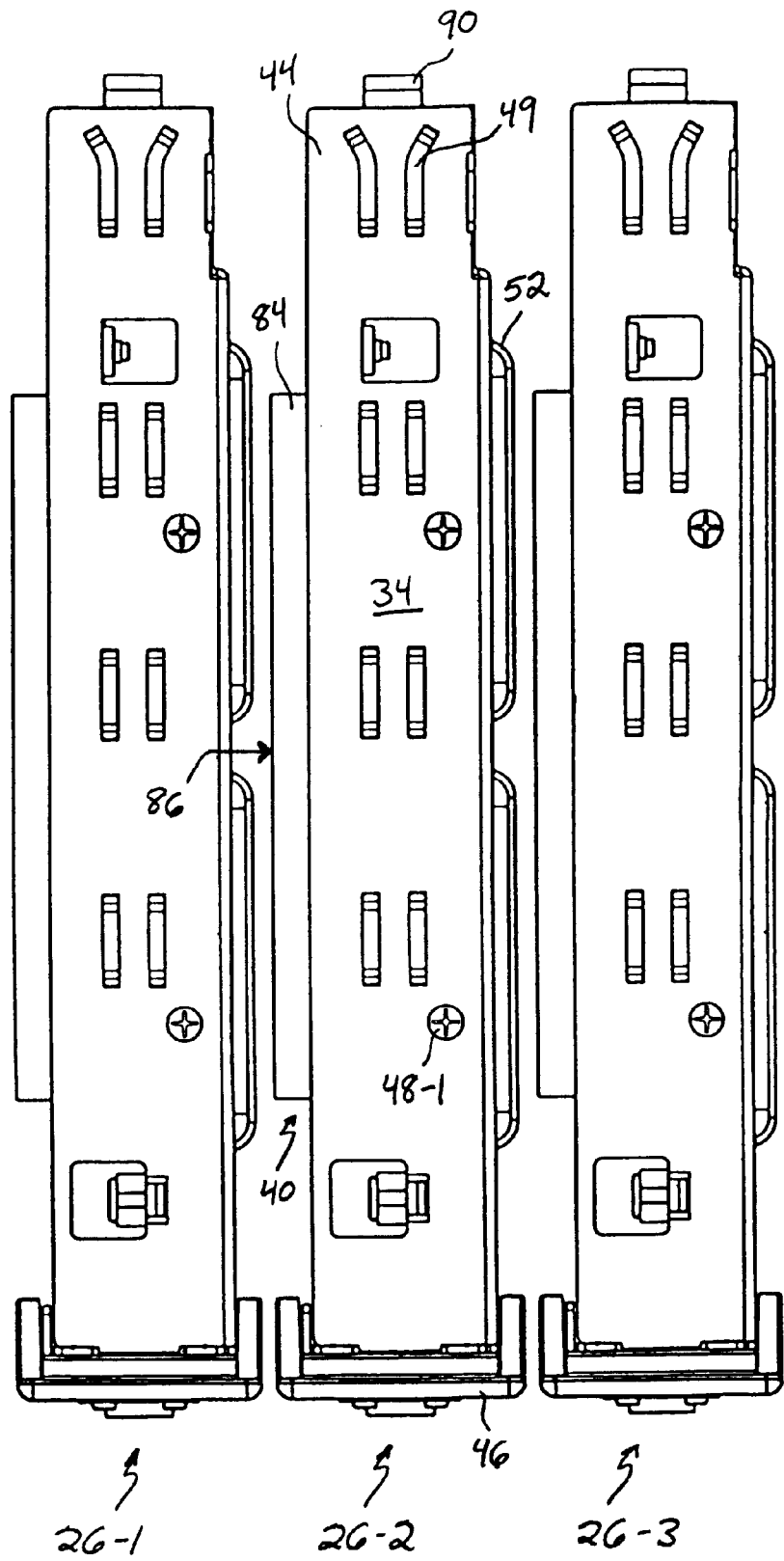
FIG. 6 is a top view of the multiple louvered disk drive assemblies of FIGS. 3A and 3B.

FIG. 6 shows a top view of the disk drive assemblies 26 of FIGS. 3A and 3B. As shown in FIG. 6, air of the air stream 32 is capable of flowing past the disk drive assemblies 26. Some of the air of the air stream 32 passes directly over the boundary layer 86 of the head disk assembly portions 84 of the disk drives 40 for effective boundary layer cooling. Additionally, some air of the air stream is intercepted by the input louvers 50, and passes through the disk drive assemblies 26 over the circuit board portions 82 (not shown in FIG. 6) and out the output louvers 52. The resulting air movements more directly break the boundary layers along side the disk drive components (i.e., the HDA portion 84, the circuit board components of the circuit board portion 82, etc.) and increases the convective heat transfer coefficient over that of conventional configurations. Furthermore, the air movement increases turbulence of the air stream 32, which also improves the efficiency of heat transfer from the components into the air stream 32.

Figure 7:
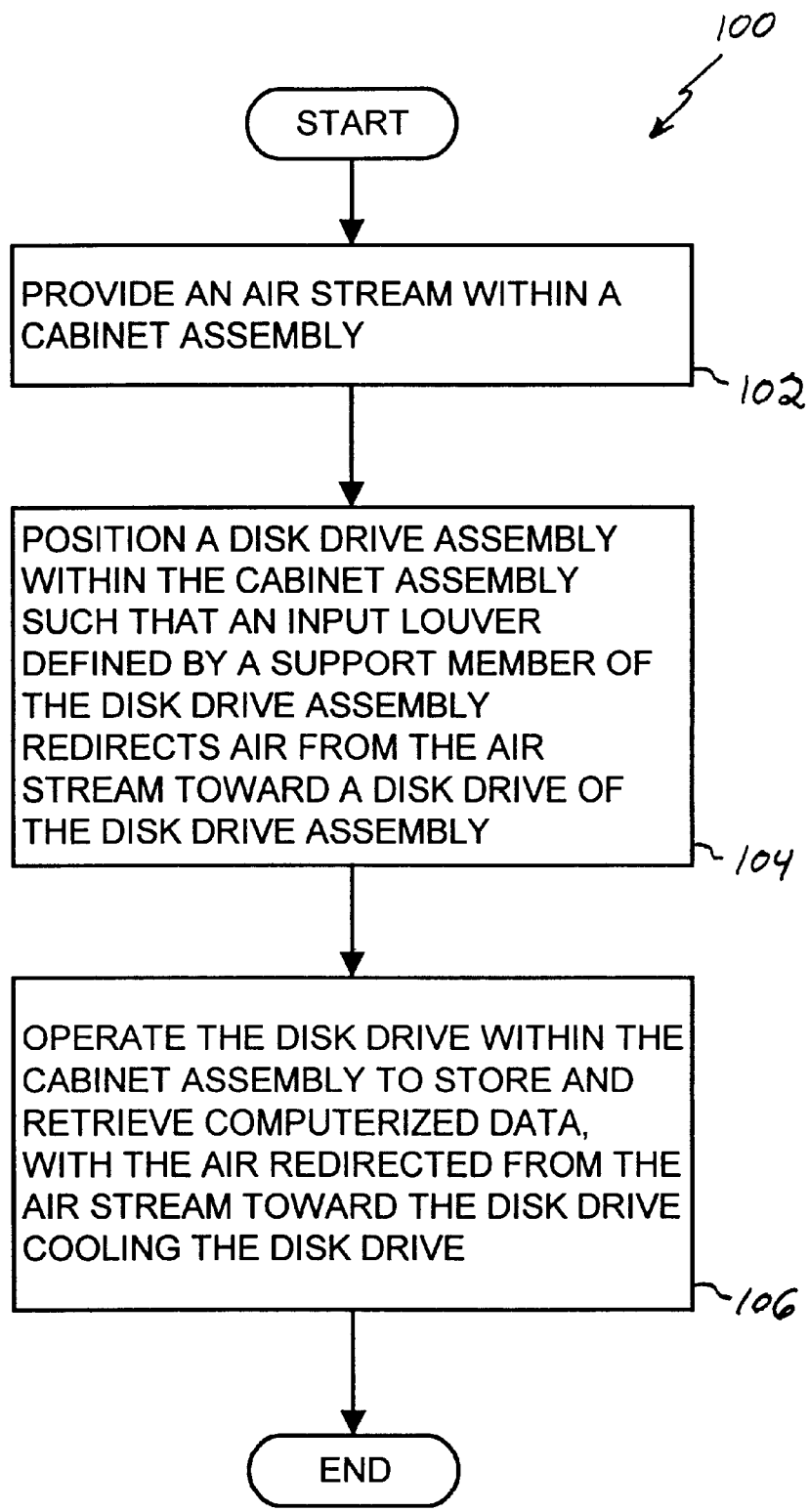
FIG. 7 is a flow diagram of a procedure which is performed by a user of the storage system of FIG. 1.

FIG. 7 is a flow diagram of a procedure 100 performed by a user of the storage system 20 to operate the storage system 20. In step 102, the user provides the air stream 32 within the cabinet assembly 22 (also see FIG. 1). In particular, the user activates the fan assembly 24 such that air flows through the cabinet assembly 22.

In step 104, the user positions the disk drive assembly 26 within the cabinet assembly 22 such that each input louver 50 defined by the support member 44 of the disk drive assembly 26 redirects air from the air stream 32 toward the disk drive 40 of the disk drive assembly 26. Air within the disk drive assembly 26 escapes out each output louver 52 back into the air stream 32.

In step 106, the user operates the disk drive 40. In particular, the user accesses the disk drive 40 in order to store and retrieve data. During operation, air redirected from the air stream 32 by the louvers 50, 52 cools the disk drive 40.

As explained above, the invention involves cooling a disk drive using a louver that redirects air from an air stream toward the disk drive. The redirected air adequately cools the disk drive thus lowering disk drive operating temperature. In particular, the redirected air impinges on the boundary layer of the disk drive that creates an improved cooling effect over that provided by a conventional housing which simply includes holes that simply expose parts of the disk drive to the air stream making it more difficult for air to get into the boundary layer. Furthermore, in one arrangement of the invention, the head disk assembly of the disk drive is fully open to the air stream for maximum heat transfer. Accordingly, the result is an effective lowering of the operating temperature of the disk drive assembly and a reduction in the disk drive failure rate. The reduced failure rate provides improved field reliability and lower repair costs. The features of the invention may be particularly useful when applied to computer-related storage systems and devices such as those manufactured by EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the storage system 20 is shown in FIGS. 1, 3A and 3B as including only one or a few disk drive assemblies 26 for simplicity. In some arrangements, the storage system 20 includes many disk drive assemblies 26. In one arrangement, the storage system 20 includes an array of disk drive assemblies 26 (e.g., eight rows by six columns).

Additionally, it should be understood that the storage system 20 is compatible with conventional disk drive assemblies (e.g., disk drive assemblies with light-weight plastic housings that surround the disk drives). Accordingly, the storage system 20 can include conventional disk drive assemblies mixed in with the disk drive assemblies 26 of FIG. 2. The disk drive assemblies 26 will provide improved cooling characteristics as described above.

Furthermore, it should be understood that the air stream 32 can flow in directions other than that shown in FIGS. 1, 3A and 3B. For example, the air stream 32 can flow in a downward direction or a horizontal direction. In the downward flowing air stream situation, the disk drive assemblies 26 need not be re-positioned. Rather, the disk drive assemblies 26 can remain in the same position such that the louvers 52 redirect air from the air stream 32 toward the disk drive 40 (i.e., the louvers 52 operate as input louvers), and the louvers 50 allow air within the disk drive assemblies 26 to escape (i.e., the louvers 50 operate as output louvers). As another example, the air stream 32 can enter or exit the cabinet in a horizontal direction even though it may travel through the cabinet assembly 22 in a vertical direction.

Additionally, it should be understood that the user can perform certain steps of the procedure 100 in a different order. For example, the user can perform step 104 before step 102. That is, the user can install the disk drive assembly 26 within the cabinet assembly 22 (step 104) and then activate the fan assembly 24 to generate the air stream 32 (step 102).

Furthermore, it should be understood that the support member 44 can include louvers on multiple sides. For example, a disk drive assembly 26 can have input and output louvers 50, 52 on a side adjacent the head disk assembly portion 84 in order to redirect air from the air stream 32 toward the boundary layer of the head disk assembly portion 84. However, in one arrangement, the housing 34 of the support member 44 is formed of sheet metal (or other similar rigid material) in order to provide adequate stiffness for reducing the amplitude of disk drive vibration as well as allow the head disk assembly portion 84 of the disk drive 40 to remain fully exposed and directly in the path of the air stream 32 for a maximum cooling effect. As another example, the louvers 50, 52 can be positioned substantially at the top and bottom of the support member 44.

Additionally, it should be understood that the louver arrangements shown in the figures include two input louvers 50 and two output louvers 52. Other arrangements of the invention include different numbers of louvers. For example, one arrangement includes three input louvers 50 and three output louvers 52. Another arrangement includes a single input louver 50 and a single output louver 52.

Furthermore, it should be understood that there is no requirement that the number of input louvers 50 equal the number of output louvers 52. Rather, the number of input and output louvers can be different.

What is claimed is:

1. A disk drive assembly, comprising:
    a disk drive that stores and retrieves computerized data;
    a connector, coupled to the disk drive, that connects the disk drive to a computerized interface; and
    a support member that supports the disk drive, the support member defining (i) an input louver that redirects air from an air stream toward the disk drive, and (ii) a housing member which is configured to couple to the input louver and to the disk drive, wherein the input louver includes:
        a redirection member which is configured to deflect air from the air stream through a hole defined by the housing member toward the disk drive.

2. The disk drive assembly of claim 1 wherein the support member defines multiple input louvers that redirect air from the air stream toward the disk drive, the multiple input louvers including the input louver.

3. The disk drive assembly of claim 1 wherein the support member further defines an output louver that enables air adjacent the disk drive to escape toward the air stream.

4. The disk drive assembly of claim 3 wherein the support member defines multiple output louvers that enable air adjacent the disk drive to escape toward the air stream, the multiple output louvers including the output louver.

5. The disk drive assembly of claim 1 wherein the support member includes a metallic housing that defines the input louver and the housing member.

6. The disk drive assembly of claim 1 wherein the disk drive includes a head disk assembly portion and a circuit board portion, and wherein the support member is configured to fully expose a side of the head disk assembly portion of the disk drive to the air stream.

7. A storage system, comprising:
    a cabinet assembly;
    a fan assembly that provides an air stream through the cabinet assembly; and
    a disk drive assembly that fastens to the cabinet assembly, the disk drive assembly including (i) a disk drive that stores and retrieves computerized data, and (ii) a support member that supports the disk drive, the support member defining:
        an input louver that redirects air from the air stream toward the disk drive of the disk drive assembly, and
        a housing member which is configured to couple to the input louver, wherein the input louver includes a redirection member which is configured to deflect air from the air stream through a hole defined by the housing member toward the disk drive.

8. The storage system of claim 7 wherein the support member of the disk drive assembly defines multiple input louvers that redirect air from the air stream toward the disk drive of the disk drive assembly, the multiple input louvers including the input louver.

9. The storage system of claim 7 wherein the support member of the disk drive assembly further defines an output louver that enables air adjacent the disk drive to escape toward the air stream.

10. The storage system of claim 9 wherein the support member of the disk drive assembly defines multiple output louvers that enable air adjacent the disk drive to escape toward the air stream, the multiple output louvers including the output louver.

11. The storage system of claim 7 wherein the support member of the disk drive assembly includes a metallic housing that defines the input louver and the housing member.

12. The storage system of claim 7 wherein the disk drive of the disk drive assembly includes a head disk assembly portion and a circuit board portion, and wherein the support member of the disk drive assembly is configured to fully expose a side of the head disk assembly portion of the disk drive to the air stream.

13. A method for cooling a disk drive, comprising the steps of:
    providing an air stream within a cabinet assembly;
    positioning a disk drive assembly within the cabinet assembly such that an input louver defined by a support member of the disk drive assembly redirects air from the air stream toward a disk drive of the disk drive assembly, a redirection member of the input louver deflecting air from the air stream through a hole defined by a housing member defined by the support member toward the disk drive, the input louver being coupled to the housing member; and
    operating the disk drive within the cabinet assembly to store and retrieve computerized data, the air redirected from the air stream toward the disk drive cooling the disk drive.

14. The method of claim 13 wherein the support member of the disk drive assembly defines multiple input louvers including the input louver, and wherein the step of positioning includes the step of:
    orienting the disk drive assembly within the cabinet assembly such that the multiple input louvers redirect air from the air stream toward the disk drive.

15. The method of claim 13 wherein the step of positioning includes the step of:
    orienting the disk drive assembly within the cabinet assembly such that an output louver defined by the support member of the disk drive assembly enables air adjacent the disk drive to escape toward the air stream.

16. The method of claim 15 wherein the support member of the disk drive assembly defines multiple output louvers including the output louver, and wherein the step of orienting includes the step of:

orienting the disk drive assembly within the cabinet assembly such that the multiple output louvers enable air adjacent the disk drive to escape toward the air stream.

17. The method of claim 13 wherein the disk drive includes a head disk assembly portion and a circuit board portion, and wherein the step of positioning includes the step of:

orienting the disk drive assembly within the cabinet assembly such that a side of the head disk assembly portion of the disk drive is fully exposed to the air stream.

18. A disk drive support member, comprising:

a metallic housing portion that supports a disk drive, the metallic housing portion defining a hole; and an input louver member portion, coupled to the metallic housing portion, which redirects air from an air stream toward the disk drive through the hole defined by the metallic housing portion, wherein the input louver member portion includes a redirection member which is configured to deflect air from the air stream through the hole defined by the metallic housing portion toward the disk drive.

19. The disk drive support member of claim 18, further comprising:

an output louver member portion, coupled to the metallic housing portion, which enables air adjacent the disk drive to escape toward the air stream.

20. A disk drive assembly, comprising:

a disk drive that stores and retrieves computerized data;

a connector, coupled to the disk drive, that connects the disk drive to a computerized interface; and a support member that supports the disk drive; the support member including:

a housing member coupled to the disk drive, and means for simultaneously stiffening the housing member and redirecting a portion of air from an air stream toward the disk drive wherein the means for simultaneously stiffening the housing member and redirecting the portion of air includes a redirection member which is configured to deflect air from the air stream through a hole defined by the housing member toward the disk drive.

21. The disk drive assembly of claim 1 wherein the housing member is substantially planar in shape, and wherein the redirection member of the input louver includes:

rigid material which extends from a location adjacent an elongated side of an elongated hole defined by the housing member into the air stream to deflect air from the air stream through the elongated hole defined by the housing member.

22. The disk drive assembly of claim 1 wherein the air stream substantially flows in an air stream direction, wherein the redirection member of the input louver is configured to deflect air of the air stream from the air steam direction to a second direction which is substantially different than the air stream direction through a first hole defined by the housing member, and wherein the support member further defines an output louver which is configured to deflect air escaping through a second hole defined by the housing member into the air stream direction.

23. The disk drive assembly of claim 22 wherein the housing member is substantially planar in shape, and wherein the housing member defines the first hole and the second hole such that the first and second holes are coplanar with each other.

24. The storage system of claim 7 wherein the housing member is substantially planar in shape, and wherein the redirection member of the input louver includes:

rigid material which extends from a location adjacent an elongated side of an elongated hole defined by the housing member into the air stream to deflect air from the air stream through the elongated hole defined by the housing member.

25. The storage system of claim 7 wherein the air stream substantially flows in an air stream direction, wherein the redirection member of the input louver is configured to deflect air of the air stream from the air stream direction to a second direction which is substantially different than the air stream direction through a first hole defined by the housing member, and wherein the support member further defines an output louver which is configured to deflect air escaping through a second hole defined by the housing member into the air stream direction.

26. The storage system of claim 25 wherein the housing member defines the first hole and the second hole such that the first and second holes are coplanar with each other.

27. A disk drive assembly, comprising:

a disk drive that stores and retrieves computerized data;

a connector, coupled to the disk drive, that connects the disk drive to a computerized interface; and a support member that supports the disk drive, the support member including (i) an input louver member that redirects air from an air stream toward the disk drive, (ii) a housing member which is configured to couple to the input louver and to the disk drive, wherein the input louver includes:

a redirection member which is configured to deflect air from the air stream through a hole defined by the housing member toward the disk drive.

28. A storage system, comprising:

a cabinet assembly;

a fan assembly that provides an air stream through the cabinet assembly; and a disk drive assembly that fastens to the cabinet assembly, the disk drive assembly including (i) a disk drive that stores and retrieves computerized data, and (ii) a support member that supports the disk drive, the support member including:

an input louver member that redirects air from the air stream toward the disk drive of the disk drive assembly, and a housing member which is configured to couple to the input louver member, wherein the input louver member includes a redirection member which is configured to deflect air from the air stream through a hole defined by the housing member toward the disk drive.

* * * * *